United States Patent
Abdelli

(10) Patent No.: US 11,572,163 B2
(45) Date of Patent: Feb. 7, 2023

(54) FLIGHT CONTROL HANDLE AND A HYBRID ROTORCRAFT PROVIDED WITH A LIFT ROTOR AND WITH AT LEAST ONE PROPELLER PROPULSIVE ROTOR THAT GENERATES THRUST

(71) Applicant: AIRBUS HELICOPTERS, Marignane (FR)

(72) Inventor: Kamel Abdelli, Marseilles (FR)

(73) Assignee: AIRBUS HELICOPTERS, Marignane (FR)

(*) Notice: Subject to any disclaimer, the term of this patent is extended or adjusted under 35 U.S.C. 154(b) by 210 days.

(21) Appl. No.: 16/903,047

(22) Filed: Jun. 16, 2020

(65) Prior Publication Data

US 2020/0398980 A1    Dec. 24, 2020

(30) Foreign Application Priority Data

Jun. 20, 2019   (FR) ...................................... 1906677

(51) Int. Cl.
  *B64C 27/56* (2006.01)
  *B64C 27/24* (2006.01)
  *B64C 27/68* (2006.01)
  *B64C 27/22* (2006.01)
  *B64C 13/04* (2006.01)

(52) U.S. Cl.
  CPC .......... *B64C 27/56* (2013.01); *B64C 13/0421* (2018.01); *B64C 27/22* (2013.01); *B64C 27/24* (2013.01); *B64C 27/68* (2013.01)

(58) Field of Classification Search
  CPC ... B64C 27/56; B64C 13/0421; B64C 13/505; B64C 13/042–0423; B64C 27/22–30; B64C 29/00–0091
  See application file for complete search history.

(56) References Cited

U.S. PATENT DOCUMENTS 2,787,746 A * 4/1957 Redmond ........... B64C 13/0427
                                                                244/236
4,488,851 A   12/1984 Young
(Continued)

FOREIGN PATENT DOCUMENTS

EP    3309061 A1   4/2018
FR    2946322 A1   12/2010
(Continued)

OTHER PUBLICATIONS

French Search Report for French Application No. FR 1906677, Completed by the French Patent Office, dated Mar. 13, 2020, 9 pages.

*Primary Examiner* — Richard Green
*Assistant Examiner* — Ashesh Dangol
(74) *Attorney, Agent, or Firm* — Brooks Kushman P.C.

(57) ABSTRACT

A flight control handle suitable for being operated by a pilot, the flight control handle including a stick-forming grip carrying an end box that is provided with a hollow shell provided with a top face, at least one control projecting towards an external environment of the top face. The flight control handle has a controllable member suitable for being actuated by a person, the end box including at least one electronic wall incorporating an electronic circuit, the electronic circuit including at least one sensor that co-operates with the controllable member.

20 Claims, 5 Drawing Sheets

(56) References Cited

U.S. PATENT DOCUMENTS

| | | | |
|---|---|---|---|
| 4,716,399 A * | 12/1987 | Nordlund | G01D 5/26 250/221 |
| 9,650,125 B2 | 5/2017 | Golborne et al. | |
| 10,011,348 B1 * | 7/2018 | Wong | B64C 29/0025 |
| 2007/0164166 A1 * | 7/2007 | Hirvonen | B64C 13/504 244/175 |
| 2008/0185282 A1 * | 8/2008 | Garcia-Briz | G05G 9/047 200/570 |
| 2010/0312421 A1 | 12/2010 | Eglin | |
| 2017/0113793 A1 * | 4/2017 | Toulmay | B64C 27/22 |
| 2017/0147106 A1 | 5/2017 | Kwon et al. | |
| 2018/0059850 A1 * | 3/2018 | Kerr | G01L 5/228 |
| 2018/0099739 A1 * | 4/2018 | Salesse-Lavergne | B64C 13/42 |
| 2019/0112071 A1 | 4/2019 | Adams et al. | |
| 2019/0113403 A1 | 4/2019 | Adams et al. | |

FOREIGN PATENT DOCUMENTS

| | | |
|---|---|---|
| FR | 3041783 A1 | 3/2017 |
| FR | 3057243 A1 | 4/2018 |
| WO | 2016043942 A2 | 3/2016 |
| WO | 2016043943 A2 | 3/2016 |
| WO | 2016043942 A3 | 6/2016 |

\* cited by examiner

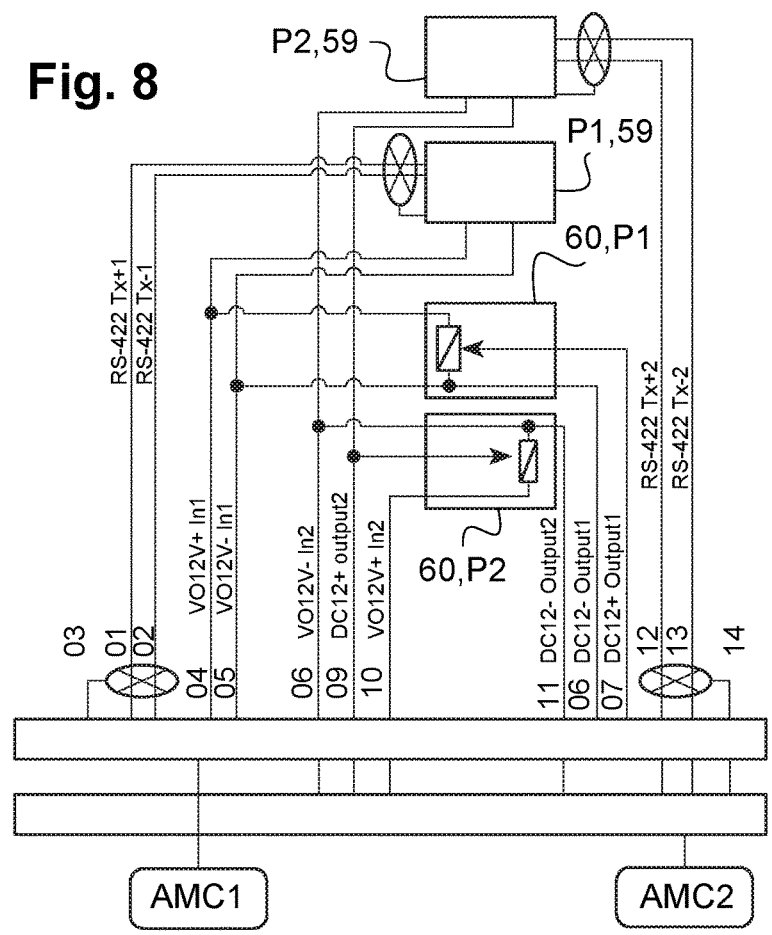
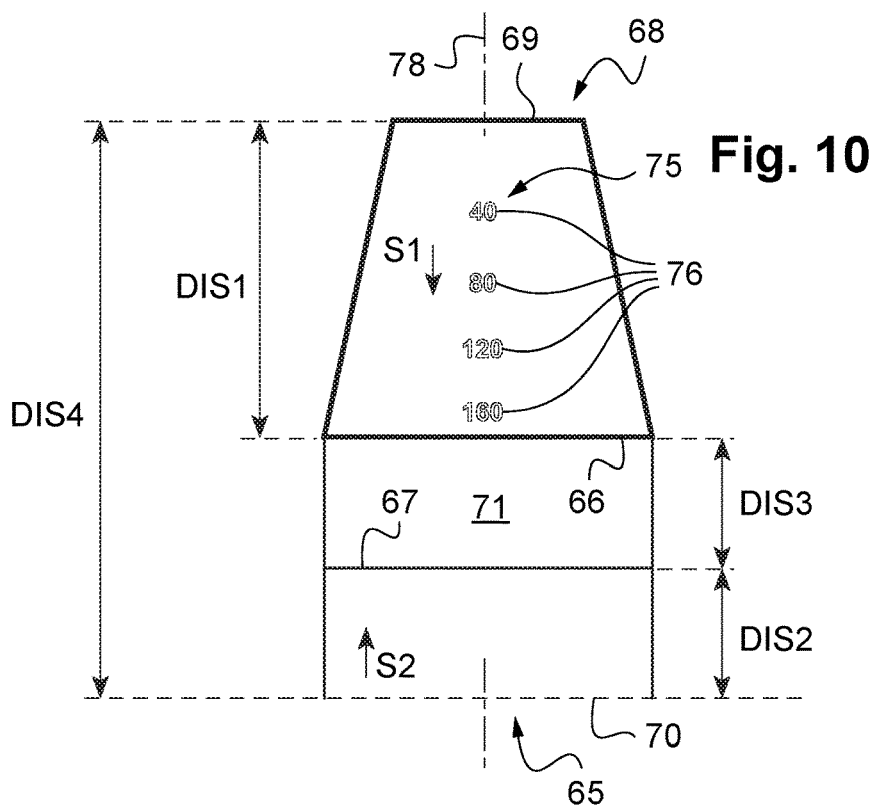

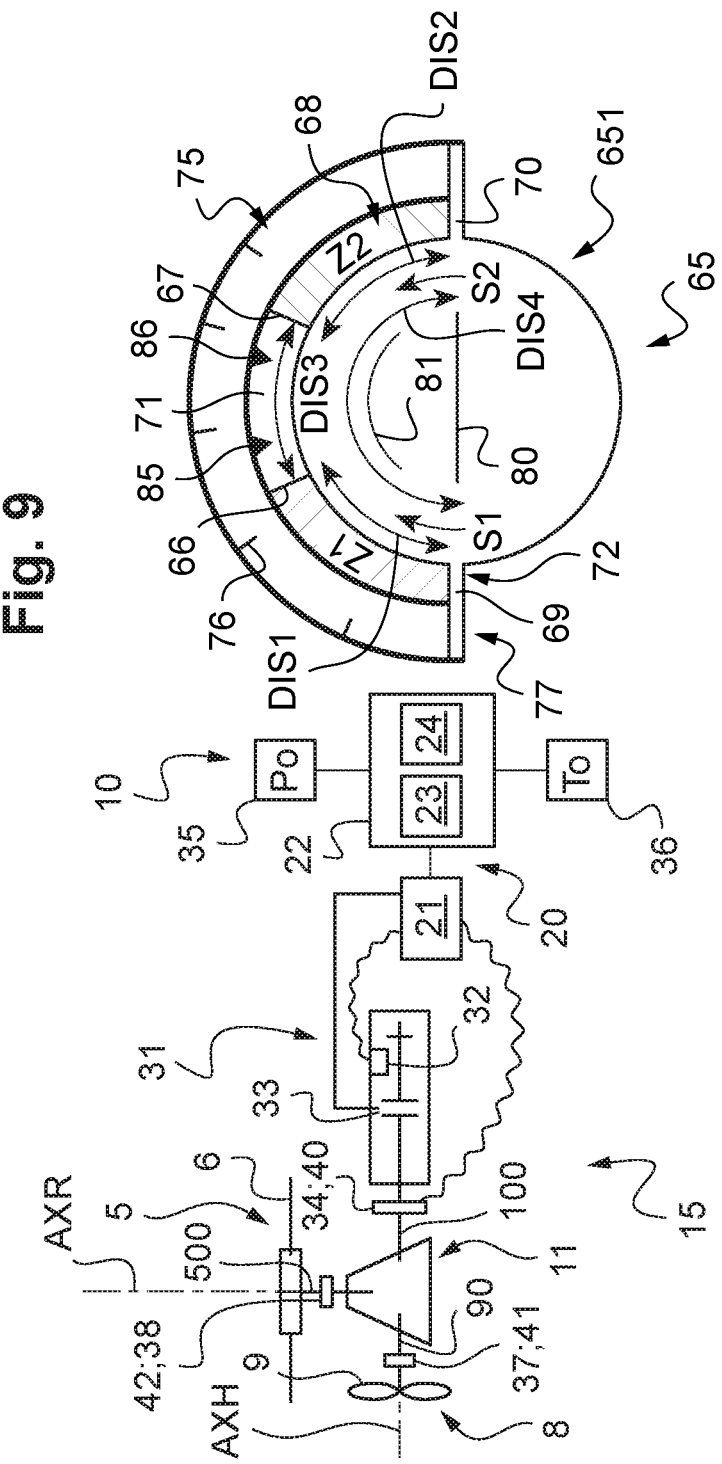

FLIGHT CONTROL HANDLE AND A HYBRID ROTORCRAFT PROVIDED WITH A LIFT ROTOR AND WITH AT LEAST ONE PROPELLER PROPULSIVE ROTOR THAT GENERATES THRUST

CROSS-REFERENCE TO RELATED APPLICATIONS

This application claims priority to French patent application No. FR 19 06677 filed on Jun. 20, 2019, the disclosure of which is incorporated in its entirety by reference herein.

BACKGROUND OF THE INVENTION

(1) Field of the Invention

The present invention relates to a flight control handle, and to a hybrid rotorcraft provided with a lift rotor and with at least one propeller propulsive rotor that generates thrust.

(2) Description of Related Art

The term "hybrid rotorcraft" is used by convenience to designate a particular type of rotorcraft in the context of the invention. A "hybrid rotorcraft" has a fuselage carrying at least one rotary wing provided with a lift rotor. The lift rotor participates at least in providing lift for the aircraft, and indeed can also participate in providing forward propulsion for it.

For example, in order to attain a high forward speed, the hybrid rotorcraft also has at least one propeller propulsive rotor that generates thrust, and that is possibly of the puller or pusher propeller type. For example, the hybrid rotorcraft may be provided with two propeller propulsive rotors referred to as "lateral" propulsive rotors and arranged transversely on either side of the fuselage.

The lift rotor and the propeller propulsive rotors are driven in rotation by a power plant. The power plant comprises at least one engine and a mechanical interconnection system for mechanically interconnecting the rotary elements. Such a mechanical interconnection system can comprise at least one main gearbox, at least one shaft, and coupling members, etc.

The limitations of an engine and the limitations of a main gearbox can make it possible to define various operating ratings at which an engine can operate, and in particular:

the takeoff rating, which is defined by a maximum takeoff power (MTOP) and by a predetermined utilization duration for which the maximum takeoff power can be used;

the maximum continuous rating, which is defined by a maximum continuous power (MCP) corresponding, for example, to about 90% of the maximum takeoff power (MTOP), and by a utilization duration for which said maximum continuous power can be used that is generally unlimited;

the extended power rating defined by an extended power that is substantially equivalent to or even equal to the maximum takeoff power (MTOP) and by a predetermined and limited utilization duration for which said extended power can be used; and a transient rating that is defined by a maximum transient power (MTP).

On a multi-engined rotorcraft, the operating envelope also covers emergency higher power contingency ratings that are used only when only one of the engines has failed:

the first emergency rating, which is sometimes referred to as the "one-engine-inoperative, 30 seconds" (OEI 30") rating, and which is defined by an emergency super-contingency power (ESCP) that is often equal to approximately in the range 112% to 120% of the maximum takeoff power (MTOP), and by a predetermined utilization duration for which the super-contingency power (ESCP) can be used, it being conventionally possible for the super-contingency power to be used three times during a flight;

the second emergency rating, which is sometimes known as the "one-engine-inoperative, two minutes" (OEI 2') rating, and which is defined by a maximum emergency contingency power (MECP) that is, for example, equal to approximately in the range 105% to 112% of the maximum takeoff power (MTOP) and by a predetermined utilization duration for which the predetermined maximum contingency power (MECP) can be used; and the third emergency rating, which is sometimes referred to as the "one-engine-inoperative, continuous" (OEI 30") rating, and which is defined by an intermediate emergency contingency power (IECP) that is substantially equal to the maximum takeoff power (MTOP), and by an unlimited duration of utilization at this intermediate contingency power (IECP) for the remainder of the flight after the engine has failed.

The hybrid rotorcraft may have first control means and second control means for respectively collectively and cyclically controlling the blades of the lift rotor. In addition, the hybrid rotorcraft includes at least one thrust control mechanism that is suitable for modifying the pitch of the blades of the propulsive rotors collectively and by the same amount. When two propeller propulsive rotors are present, anti-torque and steering control functions may be performed by using a yaw control for modifying differently the thrusts exerted by the propulsive rotors, e.g. by the pilot using a rudder bar.

Optionally, the thrust control mechanism may be incorporated into an electrical flight control architecture. For example, the thrust control mechanism may be provided with a thrust control interface that can be operated by a pilot and with at least one movement sensor that is electrically connected to at least one computer. For example, and for safety reasons, at least two dissimilar sensors are used. Arranging a thrust control interface and associated sensors in a confined location can be difficult. For example, a collective pitch lever for controlling the collective pitch of the blades of the lift rotor usually has a stick-forming grip carrying a box that is provided with a front face on which multiple buttons are disposed. Adding a thrust control interface and the associated sensors to the box, which has an environment that is already cluttered, is not simple.

In this context. Document WO 2016/043942 discloses a control mechanism that is provided with a rotary switch. That rotary switch is constrained to move in rotation with a shaft of a motor. An encoder then determines the angular position of the shaft.

Document WO 2016/043943 discloses a control mechanism that is provided with a switch that is movable between a neutral position and a plurality of non-neutral positions. A first non-neutral position causes the blades of a propeller to move in a first direction, a second non-neutral position causes the blades of a propeller to move in a second direction, and a third non-neutral position causes the blades of a propeller to move into positions in which zero thrust is generated by the propeller.

Document FR 3057 243 (equivalent to EP3309 061 or US 2018/099739) discloses an electric control device provided with manipulation means. In addition, the electric control device has a first measurement system and a second measurement system that respectively take a first measurement and a second measurement of the current position of the manipulation means. A processor unit compares the first measurement with the second measurement in order to generate a control signal as a function of said current position, said processor unit considering that the manipulation means are in a neutral position when the first and second measurements do not correspond to the same position for the manipulation means. If inconsistency is detected, the order is considered to be defective and is therefore not taken into account and is inhibited.

Document U.S. Pat. No. 4,488,851 discloses a power management system.

Document FR 3 041 733 discloses a control interface with haptic feedback, that control interface including a magnetorheological fluid module. In addition, a strain gauge is configured to detect deformation of a component consequent upon a force being exerted on a moving element.

Furthermore, a conventional rotorcraft of the helicopter type includes a first-limitation instrument, for assessing operation of its power plant with regard to limits. Such a first-limitation instrument does not appear adapted to a hybrid rotorcraft that has not only a lift rotor but also at least one propeller propulsive rotor.

Document FR 2 946 322 discloses a method of assisting piloting for an aircraft having a lift rotor and two propeller propulsive rotors. That method includes steps of determining a maximum mean pitch for the blades of the propulsive rotors as a function of a power gradient, and of displaying the maximum mean pitch on a dedicated indicator, the maximum mean pitch being displayed on a pitch graduated scale that is swept by a needle.

Document U.S. Pat. No. 9,650,125 discloses a pilot control interface designed for enabling an autopilot system to be selectively controlled by a pilot of a conventional helicopter. The control interface includes a box having a plurality of buttons that interface with corresponding switches inside the box. That box, which is made of a plastics material and/or of metal, is molded to an appropriate shape. Each button is positioned on the box.

Documents US 2019/113403 and US 2019/112071 are also known. Documents US 2017/147106 and WO 2016/043942 are also cited.

BRIEF SUMMARY OF THE INVENTION

An object of the present invention is thus to propose a flight control handle that makes it possible to facilitate piloting a hybrid rotorcraft.

The invention thus provides a flight control handle suitable for being operated by a pilot, said flight control handle including a stick-forming grip carrying an end box, said end box having a hollow shell provided with a top face, said end box having at least one control projecting towards an external environment of said top face, said at least one control being mounted to move relative to the shell.

The flight control handle may be arranged on a lever, and, for example on a collective pitch lever for collectively controlling the pitch of blades of a lift rotor.

In addition, the flight control handle has a controllable member suitable for being actuated by a person so as to generate a control order, said shell of the end box including at least one electronic wall incorporating an electronic circuit, said controllable member being carried by the electronic wall. The electronic circuit includes at least one sensor that co-operates with said controllable member, optionally so as to generate a variable electrical signal when said controllable member is actuated by a person.

The expression "at least one control projecting towards an external environment of said top face" refers to at least one member suitable for being operated by human pilot, said member being located on the top face, and being such as a push button, a switch, a Chinese hat shaped button, a toggle switch, etc.

The expression "electronic wall incorporating an electronic circuit" means a wall of the end box that incorporates the electronic circuit, such a wall being not to be confused with a wall and an electronic circuit that are independent from each other and that are fastened together by usual means such as riveting, screwing, interfitting engagement, etc. The electronic circuit may be incorporated into the thickness of the wall itself by using a plastronics method and, for example by using a method known as "Laser Direct Structuring" ("LDS"). This method is used to generate an electrically conductive track on a substrate. The substrate has a composite or thermoplastic material including an additive, which additive takes the form of an organic metal. The additive is "activated" by a laser passing over it. The laser forms microscopic grooves and craters in which copper can be firmly anchored by dipping the part Into a catalyst bath.

The expression "controllable member" means a member that can be actuated by a person, and, for example, by the index finger of a hand of a person, such as a rotary knob, a knob that moves in translation, a touch-sensitive face, etc. The controllable member is distinct from the controls present on the top face. The electronic wall may be distinct from the top face. Actuation of the controllable member is detected by the sensor, the electronic circuit generating a signal as a function of said actuation.

The internal volume of an end box, e.g. a box arranged on a collective pitch lever for controlling the collective pitch of a lift rotor, is cluttered due to the various controls carried by said end box.

The invention proposes to add a controllable member that is suitable for controlling, for example, thrust generated by a propulsive system or indeed suitable for performing other functions, the electronic circuit that co-operates with said controllable member being an integral part of a wall of the end box that carries said controllable member. This solution then makes it possible to arrange such a controllable member in an environment that may be cluttered, and optionally in a zone that is usually not used. In addition, such a controllable member may have a large control amplitude, unlike a button of the Chinese hat type, for example. The controllable member may then make it possible to obtain a large control amplitude and may make it possible to generate precise piloting orders.

The flight control handle may also tend to optimize the piloting ergonomics, since a pilot can operate the controllable member with the index finger of the hand holding the flight control handle.

The flight control handle may also have one or more of the following characteristics.

In a first embodiment, the controllable member may comprise a knob that is mounted to move relative to the end box and that is arranged at least partially outside of said shell, said at least one sensor co-operating with said knob.

In a first variant of the first embodiment, the knob may be in the form of a slide that is mounted to move in translation.

The knob may contain a knob push enabling a control level to be set without having to hold the knob actuated.

In a second variant of the first embodiment, the knob may take the form of a rotary knob mounted to move in rotation relative to the end box about an axis of rotation, said rotary knob having a wheel arranged outside of said shell, said at least one sensor co-operating with said rotary knob.

The term "wheel" means a member suitable for being controlled by a pilot and mounted to move in rotation. Such a wheel may have a large control amplitude.

In one example, the rotary knob may have a stationary shaft that is secured to the electronic wall of the shell, the wheel being mounted to rotate about the shaft.

In another example, the rotary knob may have a shaft constrained to rotate with the wheel about the axis of rotation, said shaft being carried by the electronic wall of said shell, said shaft being mounted to move in rotation relative to the shell.

Arranging the wheel is then relatively simple.

Bearings that are optionally rolling bearings or some equivalent means may be arranged between the shaft and the shell. At least one friction member and/or at least one spring may also be arranged.

In another aspect, said wheel may have a diameter greater than a length of the shell, and optionally than a length of one side of the shell, said wheel projecting from the shell along at least one direction as seen looking from the wheel towards the shell/side.

This characteristic may tend to facilitate operating the wheel.

In a second embodiment/the controllable member may have a touch-sensitive face.

Said touch-sensitive face may optionally be used to perform various functions.

Regardless of the embodiment, the electronic wall may be adjoining to the top face.

For example, the shell may be substantially in the shape of a slab, it being possible for said shell to include one or more mechanical parts. Depending on the position of the pilot relative to the flight control handle, the electronic circuit may be incorporated into the left side or into the right side of the shell as the pilot sees it, e.g. so that the controllable member can be reached by the index finger of the hand of the pilot gripping the flight control handle.

In another aspect, the electronic circuit may be connected to at least one electrical connection running through said stick-forming grip.

Such an electrical connection may take the form of a wire or indeed of an electrical track incorporated into a wall of the stick-forming grip or into another wall of the shell by using a plastronics manufacturing method.

In another aspect, said at least one sensor may have at least one pair of dissimilar sensors that, for example, each generate a signal that varies as a function of a movement in rotation of said wheel when such a wheel is present, the two sensors in any one pair being configured to communicate with the same computer.

The expression "pair of dissimilar sensors" means that the two sensors in any one pair operate differently. Such a characteristic may tend towards obtaining a system that is robust to failure.

For example, the computer may control at least one servo-control for servo-controlling a propulsive system as a function of the measurements taken by the two sensors.

For example, the two sensors in a said pair may comprise a Hall effect sensor and a potentiometer.

Optionally, said at least one sensor may have at least two said pairs that are configured to communicate with respective ones of two computers.

For safety reasons, two pairs of sensors may be arranged in the electronic circuit, each pair communicating with its own computer.

The invention also provides a hybrid rotorcraft, the hybrid rotorcraft having a propulsive system comprising at least one propulsive rotor provided with a plurality of first blades having a first variable pitch at least for participating in providing forward propulsion for the hybrid rotorcraft, said hybrid rotorcraft further including a lift rotor provided with a plurality of second blades having a second variable pitch at least for participating in providing lift for the hybrid rotorcraft, said hybrid rotorcraft having a power plant provided with at least one engine operating at at least one rating for the purposes of driving said lift rotor in rotation and of driving each propulsive rotor of said propulsive system in rotation.

The hybrid rotorcraft has a flight control handle of the invention, said electronic circuit being configured to control said first pitch collectively.

When a controllable member of the touch-sensitive face type is present, said touch-sensitive face may perform other functions on request, and may, for example, cause a pointer to move on a screen. For example, an additional member may make it possible to assign various functions to the controllable member.

Optionally, said flight control handle is mounted to move about a flight control axis for controlling said second pitch collectively.

In one possibility, said flight control axis may be parallel to said axis of rotation of the rotary knob.

BRIEF DESCRIPTION OF THE DRAWINGS

The invention and its advantages appear in greater detail from the following description of examples given by way of illustration with reference to the accompanying figures, in which:

FIG. 8 is a diagram showing an electric circuit connecting such an electronic wall to at least one computer;

FIG. 9 is a diagram showing a device for assisting piloting of such a hybrid rotorcraft with an Indicator that has a curved movement path; and FIG. 10 is a diagram showing an indicator that has a linear movement path.

DETAILED DESCRIPTION OF THE INVENTION

Elements that are present in more than one of the figures are given the same references in each of them.

Figure 1:
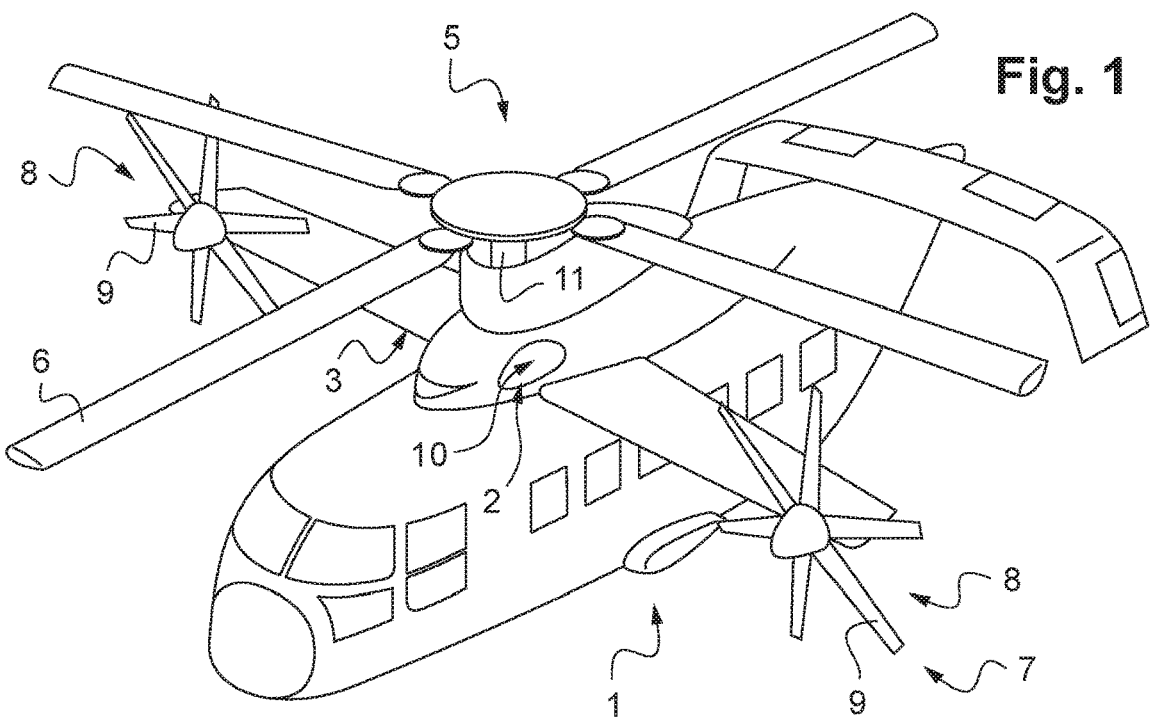
FIG. 1 is an isometric view of a hybrid rotorcraft.

FIG. 1 shows an aircraft 1 of the hybrid rotorcraft 1 type of the invention that is provided with a fuselage carrying at least one lift rotor 5 and a propulsive system 7.

The propulsive system 7 includes at least one propulsive rotor 8, e.g. of the propeller type, comprising a plurality of first blades 9 having a first variable pitch that can be varied at least collectively or indeed only collectively, for example. In one possibility, the hybrid rotorcraft 1 includes a first propeller propulsive rotor and a second propeller propulsive rotor that are disposed on either side of the fuselage 1, optionally at either outer end of a wing 3. The lift rotor 5 is provided with a plurality of second blades 6 having a second variable pitch that can be varied collectively and cyclically, for example.

In order to drive the lift rotor 5 and each propulsive rotor 8 in rotation, the aircraft 1 includes a power plant 2 provided with at least one engine 10, e.g. of the turboshaft engine type. In addition, the power plant 2 may include an interconnection system 11 including at least one power transmission gearbox, at least one transmission shaft, etc.

The speeds of rotation of the outlet shafts of the engines 10, of the propulsive rotors 8, of the lift rotor 5, and of the interconnection system 11 are optionally mutually proportional, with the proportionality ratio being variable or constant regardless of the flight configuration of the hybrid rotorcraft 1 under normal operating conditions of the integrated drive system.

Furthermore, each engine 10 operates within an operating envelope including one or more of the above-mentioned power ratings, namely, for example: a takeoff rating defining a maximum takeoff power (MTOP), a maximum continuous rating defining a maximum continuous power (MCP), a transient rating defining a maximum transient power (MTP), a first emergency rating defining an emergency super-contingency power (ESCP), a second emergency rating defining a maximum emergency contingency power (MECP), and/or a third emergency rating defining an intermediate emergency contingency power (IECP).

Figure 2:
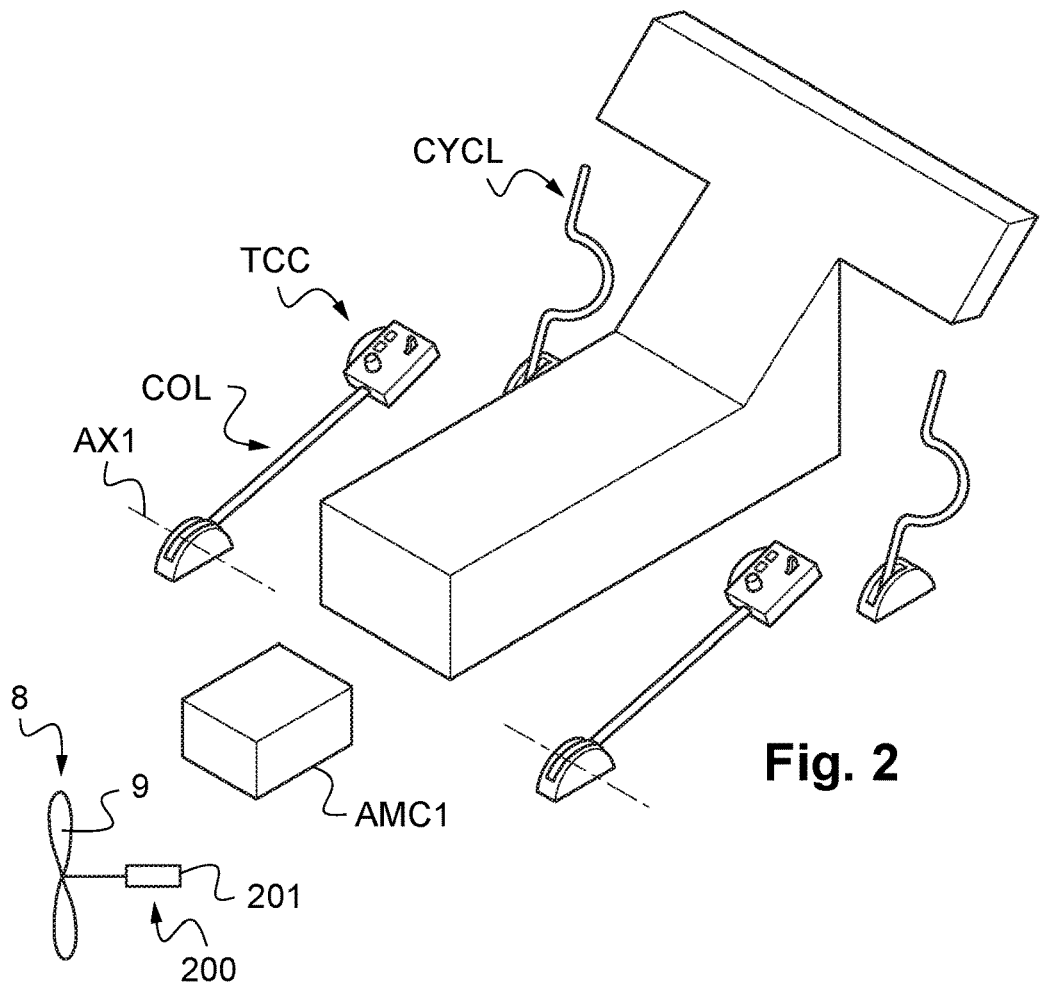
FIG. 2 is a diagram showing the piloting controls for piloting a hybrid rotorcraft of the invention.

In order to control the hybrid rotorcraft 1, and with reference to FIG. 2, each pilot may have a thrust control TCC for collectively changing the first pitch of the first blades of each propulsive rotor 8, and, for example, a mean pitch of the first blades 9 of the propulsive rotors 8.

More precisely, the thrust control TCC acts identically on the first pitches of the first blades 9 in order to obtain a collective variation in the first pitch of the first blades 9. For example, the pilot might request an increase of 5° in the mean pitch of all of the first blades 9 of the propulsive rotors 8 so as to increase the resulting thrust that is generated in particular by the first propulsive rotor and by the second propulsive rotor, the mean pitch of the first blades 9 of the first and second propulsive rotors optionally being equal to the half-sum of the pitches of the first blades 9 of the two propulsive rotors 8.

The thrust control may transmit an order, e.g. to at least one piloting computer AMC1, said piloting computer AMC1 controlling a drive system 200 connected to the first blades 9 of the propulsive rotors 8. For example, the piloting computer AMC1 controls at least one actuator 201 disposed along said drive system 200.

In order to control the yaw attitude of the hybrid rotorcraft 1, the pilot may have a yaw control device provided with yaw control means (not shown), e.g. means for controlling the pitches of the first blades 9 of the two propulsive rotors 8 differently. For example, only the collective pitch of the first blades 9 of one propulsive rotor 8 is modified in order to act on the yaw behavior of the hybrid rotorcraft.

Finally, the hybrid rotorcraft 1 is provided with usual control means CYCL, COL for collectively and cyclically controlling the pitch of the second blades 6 of the lift rotor 5. For example, the thrust control TCC may be carried by a pitch lever COL that is mounted to move in rotation about a flight control axis AX1 for the purpose of controlling the second pitch of the second blades 6 collectively. A cyclic control CYCL may control the second pitch of the second blades 6 of the lift rotor 5 cyclically.

Figure 3:
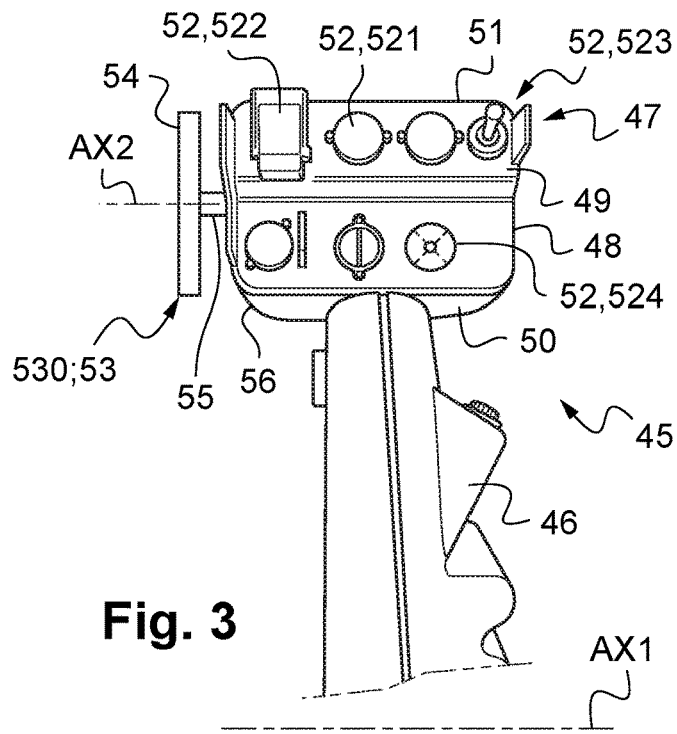
FIG. 3 is a diagram showing a flight control handle of the invention provided with a rotary knob and as seen from above.

In this context, FIG. 3 shows a flight control handle 45 of the invention. For example, but not exclusively, said flight control handle 45 may be arranged on the pitch lever COL shown in the preceding figure, on the cyclic control CYCL, or on some other type of vehicle.

Regardless of how it is arranged, the flight control handle 45 of the invention includes a stick-forming grip 46 that is optionally hollow. For example, the stick-forming grip 46 may be arranged on a tube of a lever. In addition, the flight control handle 45 is provided with an end box 47 carried by the stick-forming grip 46.

Said end box 47 includes a hollow shell 48. The shell 48 is provided, in particular, with a top face 51. In addition, the end box 47 also includes at least one control 52 that can be operated by a pilot holding the flight control handle 45. Each control 52 projects from the top face 51 towards an external environment EXT. In other words, each control 52 includes a member that extends outside the shell so that it can be operated by a pilot. Furthermore, each control 52 is mounted to move relative to the shell 48. In the example shown, extending above the top face 51 are at least one control 52 of the push button type 521 and/or a control 52 of the rocker switch type 522 and/or a control 52 of the toggle type 523 and/or a control 52 of the Chinese hat type 524. All of the controls may be connected to wired connections running through the stick-forming grip.

Furthermore, the flight control handle 45 has a controllable member 530 that may be actuated by a person in order to generate a signal, it being possible for the signal to modify the behavior of at least one member, such as the pitch of a blade or the position of a pointer on a screen, for example. The end box 47 then includes at least one electronic wall 56 carrying the controllable member. This electronic wall 56 incorporates an electronic circuit 58, which electronic circuit 58 includes at least one sensor co-operating with the controllable member to detect operation of said controllable member and to generate a signal as of function of this actuation.

Figure 4:
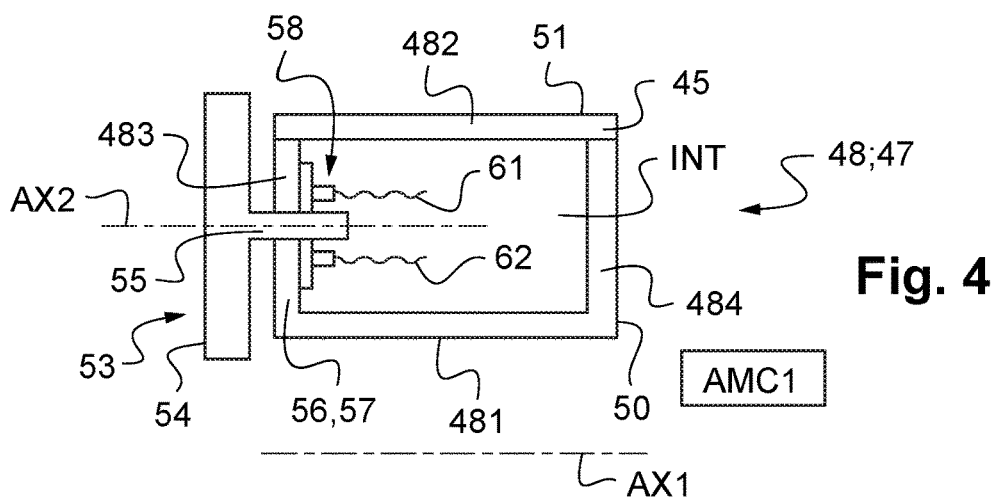
FIG. 4 is a diagram showing an electronic wall incorporating an electronic circuit of said flight control handle of FIG. 3.

With reference to FIG. 4, the shell 48 delimits a hollow internal volume INT. For example, the internal volume INT is delimited in an elevation direction by a bottom wall 481 and by a top wall 482 including the top face, in a transverse direction and seen from above by a left wall 483 and by a right wall 484, and from front to back by a front wall and by a rear wall. For example, the various walls of the shell 48 are formed by one or more elements. In the example shown, the bottom wall 481, the left wall 433, the right wall 484, the front wall and the rear wall together form a container that is closed reversibly by the top wall 482.

Independently of this aspect, and in a first embodiment, the controllable member 530 may comprise a knob that is mounted to move relative to the end box 47 and that is arranged at least partially outside of said shell 48.

In the first variant of the first embodiment shown in FIG. 4, the controllable member 530 may comprise a rotary knob 53. The rotary knob 53 is mounted to move in rotation relative to the end box 47 about an axis of rotation AX2. When the flight control handle 45 is mounted to move about a flight control axis AX1, e.g. by being arranged on a lever COL that collectively controls the second pitch of the second blades of a lift rotor 5, the axis of rotation AX2 may be parallel to the flight control axis AX1.

The rotary knob 53 may have a wheel 54 arranged outside the shell 48, i.e. outside the internal volume INT. Optionally, the rotary knob 53 may also have a shaft 55 that is constrained to rotate with the wheel 54 about the axis of rotation AX2.

Said shaft 55 is then carried by the shell 48 and in particular by a side 57 of the shell 48 that forms the electronic wall 56, e.g. a side 57 adjoining the top face 51. For example, said side 57 that forms the electronic wall 56 may be the above-mentioned left wall or the above-mentioned right wall. The shaft 55 is also mounted to move in rotation relative to the side 57 about the axis of rotation AX2. For example, a bearing is arranged between the shaft 55 and the side 57.

In another example (not shown), the wheel 54 is mounted to move in rotation about the axis of rotation AX2 by turning about a stationary shaft.

Figure 5:
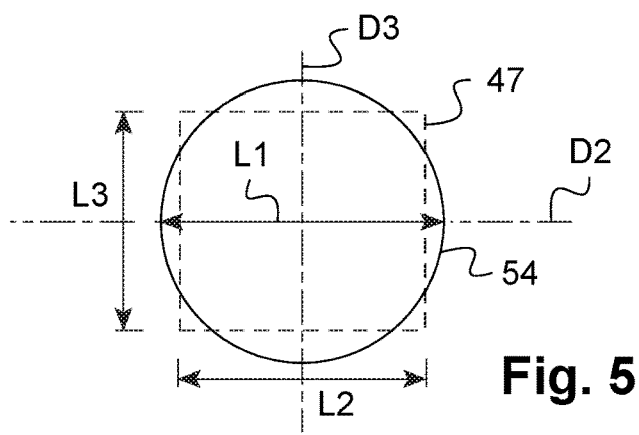
FIG. 5 is a diagram showing the flight control handle of FIG. 3 as seen from one side.

With reference to FIG. 5, the wheel 54 may have a diameter L1 that is maximized relative to the shell 48 so as to be readily accessible for an index finger of a pilot. Said diameter L1 may, however, be established in order to avoid any rubbing, hindrance, or undesired control with respect to the hand of a pilot. For example, as seen in a direction going from the wheel 54 to the shell 48, said shell 48 may extend longitudinally along a longitudinal direction 112 over a first length L2 and in elevation along an elevation direction D3 over a second length L3, the first length L2 and/or the second length L3 being less than the diameter L1.

Figure 6:
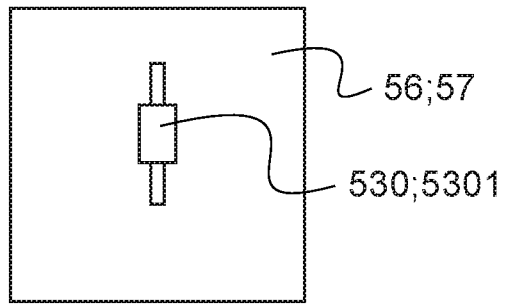
FIG. 6 is a diagram showing a flight control handle provided with a knob that is mounted to move in translation.

In the second variant of the first embodiment shown in FIG. 6, the controllable member 530 may comprise a knob 5301 that is mounted to move in translation.

Figure 7:
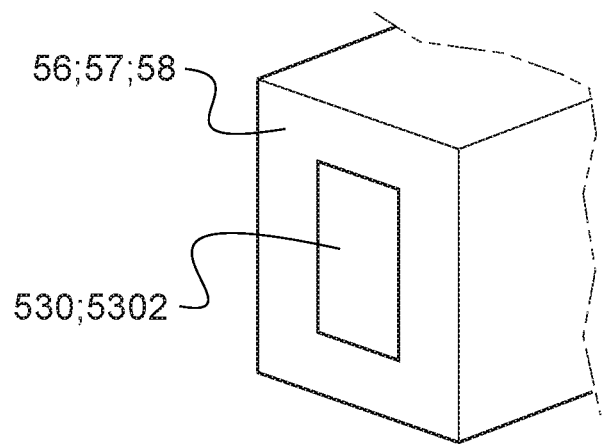
FIG. 7 is a diagram showing a flight, control handle provided with a touch-sensitive face.

In the second embodiment shown in FIG. 7, the controllable member 530 may comprise a touch-sensitive face 5302 that is not only carried by but also incorporated into the electronic wall 56.

In another aspect and with reference to FIG. 4, regardless of the embodiment, the end box 47 therefore has an electronic wall 56 incorporating an electronic circuit 58. For example, the side 57 carrying a shaft 55 of the rotary knob 53 forms said electronic wall 56. Such an electronic; wall 56 may be obtained by using a plastronics method.

The electronic circuit 58 is provided with at least one sensor co-operating with the rotary knob 53 if any. The electronic circuit 58 generates at least one signal that varies when the controllable member is actuated, and, more precisely in the example shown in FIG. 4, when the wheel 54 is caused to move in rotation about the axis of rotation AX2. For example, such a signal may be an analog signal or a digital signal.

For example, the electronic circuit 58 may further include at least one electrically conductive track. In addition, the electronic circuit 58 may be connected to at least one electrical connection 61, 62. This electrical connection 61, 62 may be a wired connection running through or along the stick-forming grip 46 and/or through or along the box and/or incorporated by plastronics into at least one member of the stick-forming grip and/or of the box.

Optionally, and for example when a wheel is present, the electronic circuit 55 has at least one pair of dissimilar sensors 59, 60, each of which generates a signal that varies as a function of the actuation of the controllable member, and possibly, for example, as a function of a movement in rotation of the wheel 54 or of a movement in translation of the button 5301 or of pressure exerted on the touch-sensitive face 5302. The two sensors 59, 60 in any one pair may communicate with the same piloting computer AMC1. For example, and in particular when the wheel 54 is present or when the button 5301 is present, the two sensors in any one pair respectively comprise a Hall effect sensor 59 and a potentiometer 60.

With reference FIG. 8, to the electronic circuit 58 may have at least two said pairs 301, 302 of sensors 59, 60, the two sensors 59, 60 in any one pair 301 communicating with a first piloting computer AMC1 and the two sensors 59, 60 of the other pair 302 communicating with a second piloting computer AMC2.

Independently of the type of a control handle serving, for example, to control the thrust for a rotorcraft, in order to avoid being faced with operations that might, endanger the hybrid rotorcraft 1, said hybrid rotorcraft 1 may be provided with a piloting assistance device 15.

FIG. 9 shows such a piloting assistance device 15. This piloting assistance device 15 includes an on-board computer 20. In addition, the piloting assistance device 15 includes an indicator 65 controlled by the on-board computer 20, as well as a plurality of sensors that are connected to the on-board computer 20.

The on-board computer 20 may comprise one computer or else a plurality of computers that communicate with one another. In the example shown, the on-board computer 20 includes at least one central computer 22, and one usual engine computer 21 per engine or one usual motor computer per motor, or indeed one or more of the above-mentioned piloting computers. The central computer 22 may be merged with one of the above-mentioned piloting computers.

Such an engine computer 21 is, for example of the type of a computer of a system known as a Full Authority Digital Engine Control (FADEC). Each engine computer 21 is then connected to at least one engine sensor. Such an engine computer 21 may regulate a fuel burning engine, e.g. by controlling its fuel metering device, or else it may regulate an electric motor. For each operating rating, such an engine computer 21 may also deliver the available power margin for each engine relative to the maximum power at that rating, and may deliver a value for a current power being delivered by said engine.

In another example, only one computer is used.

Each computer may, for example, comprise at least one processor 23, at least one memory 24, at least one integrated circuit, at least one programmable system, and/or at least one logic circuit, these examples not limiting the scope given to the term "computer".

The on-board computer 20 is then connected by wired or wireless connections to sensors 31 for measuring monitoring parameters for monitoring each engine 10. For example, each engine computer 21 is then connected to at least one set of engine sensors. The monitoring parameters for monitoring an engine 10 may include at least one parameter to be selected from a list that includes the speed of rotation Ng of a gas generator of each engine 10, the torque TQ of each engine 10, and a gas temperature, e.g. the gas temperature T45 at the inlet to a low-pressure free turbine of each engine 10. Under such circumstances, for each engine 10, the piloting assistance device 15 may possess a measurement sensor 32 for measuring the speed of rotation Ng of the engine, a torque meter 34 for measuring the torque TQ developed by the engine 10 on an engine outlet shaft 100 driven by said engine 10, and a measurement sensor 33 for measuring the gas temperature T45 of the engine 10. A sensor 40 for sensing engine speed of rotation may measure the speed of rotation of the engine outlet shaft.

Furthermore, the piloting assistance device 15 may include a sensor 35 for sensing outside pressure $P_o$ and a sensor 36 for sensing outside temperature $T_o$, which sensors are connected to the on-board computer 20, and, for example, to the central computer 22.

Furthermore, the on-board computer 20, and, for example, the central computer 22, may be connected to one propulsive rotor torque meter 37 per propulsive rotor 8. Each propulsive rotor torque meter 37 may measure torque on a propulsive rotor shaft 90 that drives the propulsive rotor 8 in rotation about its axis of rotation AXH. A sensor 41 for sensing propulsive rotor speed of rotation may measure the speed of rotation of the propulsive rotor shaft 90.

The on-board computer 20, and, for example, the central computer 22, may be connected to a rotor torque meter 38. The rotor torque meter 38 may measure torque on a rotor shaft 500 that drives the lift rotor 5 in rotation about its axis of rotation AXR. A sensor 42 for sensing rotor speed of rotation may measure the speed of rotation of the rotor shaft 500.

The on-board computer 20, and, for example, the central computer 22, may be connected to a mean pitch sensor that measures the current mean pitch of the first blades of the propulsive rotor 8 and/or to an air speed sensor that is suitable for measuring the true air speed of the hybrid rotorcraft and/or to a speed-of-rotation sensor that measures the speed of rotation of the propulsive rotors 8 and/or to a speed-of-rotation sensor that measures the speed of rotation of the lift rotor 5 and/or to a pitch sensor that measures the collective pitch of the second blades of the lift rotor 5.

Furthermore, the on-board computer 20 is connected to an indicator 65 via usual connections (not shown). Such an indicator has a screen 651 and optionally a computer, or indeed one of the above-mentioned computers.

The indicator 65 has a movement path 63 that extends from a first end 69 to a second end 70.

In one method, the on-board computer 20 transmits a signal to the indicator 65. As a function of that signal, the indicator 65 positions a first pointer 66 on the movement path 68. The position of the first pointer 66 is computed by the on-board computer 20 or by the indicator 65 and varies as a function of a first power P1 from the power plant 2 that is consumed by the propulsive system 7.

In addition, the indicator 65 positions a second pointer 67 on the movement path 68. The position of the second pointer 67 is computed by the on-board computer 20 or by the Indicator 65 and varies as a function of a second power P2 from the power plant 2 that is consumed by the lift rotor 5.

In particular, the first pointer 66 moves in a first movement direction S1 towards the second end 70 when the first power P1 increases. Conversely, the second pointer 67 moves in a second movement direction S2 towards the first, end 69 when the second power P2 increases, the second direction S2 being opposite to the first direction S1.

In addition, a variable space 71 separates the first pointer 66 and the second pointer 67 so long as the power plant 2 has a power margin relative to the maximum power associated with the current rating.

Therefore, a first distance DIS1 between the first end 69 and the pointer 66 is established to be the image of the first power P1, a second distance DIS2 between the second end 70 and the second pointer 67 being the image of the second power P2. In addition, the gap 74 between the first pointer 66 and the second pointer 67 extends over a third distance DIS3 representing a power margin from the power plant 2 that is not used at the current rating so long as the first pointer 66 is situated between the first end 69 and the second pointer 67. The fourth distance DIS4 that corresponds to the sum of the first distance DIS1, of the second distance DIS2, and of the third distance DIS3 is the image of the maximum available power at the current rating.

Optionally, the indicator 65 gives a first zone Z1 that is situated between the first end 69 and the first pointer 66 a first background that is visually identifiable so as to facilitate reading the information. The indicator 65 may give a second zone 72 situated between the second end 70 and the second pointer 67 a second background that is visually identifiable and that is optionally different from the first background. For example, the first zone Z1 and the second zone 22 have hatchings and/or colors that are different.

In an example of computing the positions of the pointers 66, 67, the on-board computer 20 determines the values of the first power P1 and of the second power P2 and transmits these values and the maximum power to the indicator 65. The indicator 65 then determines a target position on the indicator 65 for the first pointer 66 as a function of the first power P1 and a target position for the second pointer 67 as a function of said second power P2 using at least one relationship stored in a memory. The maximum power may be taken into account. In an example, the first distance DIS1 is computed as a function of the product of a constant multiplied by a quotient of the first power P1 divided by the maximum power, the second distance DIS2 being computed as a function of the product of said constant multiplied by a quotient of the second power P2 divided by the maximum power.

Optionally, the on-board computer 20 may compute the first power P1 by means of the sum of the power consumed by each propulsive rotor. This power consumed by each propulsive rotor may be obtained by taking the propulsive rotor torque 8 exerted on the propulsive rotor shaft 90 and multiplying it by the speed of rotation of the propulsive rotor shaft 90, these values being measured respectively by the propulsive rotor torque meter 37 and by the propulsive rotor speed-of-rotation sensor 41. Alternatively, the on-board computer 20 computes the power consumed by each propulsive rotor 8 by means of polars that are stored in a memory, and by means of parameters of the propulsive rotor 8 such as the radius of the second blades, the speed at the tips of the first blades of the propulsive rotor, the air speed of the aircraft, the pitch of the second blades, etc.

Optionally, the on-board computer 20 may compute the second power P2 consumed by the lift rotor by taking the torque exerted on the rotor shaft 500 and multiplying it by the speed of rotation of the rotor shaft 500, those values being measured respectively by the rotor torque meter 38 and by the rotor speed-of-rotation sensor 42.

In another computation example, the on-board computer 20 determines the values of a current first collective pitch of the first blades 9 and of a second current collective pitch of the second blades 6. The indicator 65 then determines a target position on the indicator 65 for the first pointer 66 as a function of the first current collective pitch and a target position for the second pointer 67 as a function of the second current collective pitch.

Regardless of the computation, each pointer may show a collective pitch expressed as power.

In another aspect, the first pointer 66 may also point to an air speed scale 75 for the air speed of the hybrid rotorcraft 1. For example, the first pointer reeves in parallel with graduations 76, each of which relates to a respective air speed.

In another aspect, the on-board computer may computer at least one first pitch limit 85 for the pitch of the first blades 9, optionally via a conversion into equivalent power, and transmit a signal carrying said first pitch limit to the indicator. The indicator computes the location of a symbol representing the first pitch limit 85 along the movement path and displays said symbol illustrating the first pitch limit 85 along the movement path 68.

In another aspect, the on-board computer 20 may compute at least one second pitch limit 86 for the pitch of the second blades 6, optionally via a conversion into equivalent power, and transmit a signal carrying said second pitch limit 86 to the indicator. The indicator computes the location of a symbol representing the second pitch limit 86, along the movement path and displays said symbol illustrating the second pitch limit 86 along the movement path 68.

In another aspect and with reference to the embodiment shown in the movement path 68 may be in the shape of a first circular arc 72. Where applicable, the air speed scale 75 is positioned on a second circular arc 77 adjoining the first circular arc 72, e.g. above the first circular arc 72.

Optionally, the first circular arc 72 may be situated above an artificial horizon 80 and/or above a heading 81.

In the embodiment shown in FIG. 10, the first pointer 66 and the second pointer 67 may be mounted to move linearly, e.g. along a direction 78 superposed on an air speed scale 75 for the air speed of the hybrid rotorcraft 1, said air speed scale 75 being provided with graduations 76.

Naturally, the present Invention can be the subject of numerous variants as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A flight control handle suitable for being operated by a pilot, the flight control handle including a stick-forming grip carrying an end box, the end box having a hollow shell provided with a top face, the end box having at least one control projecting towards an external environment of the top face, the at least one control being mounted to move relative to the shell;
   wherein the flight control handle has a controllable member suitable for being actuated by a person so as to generate a control order, the shell of the end box including at least one electronic wall incorporating an electronic circuit, the controllable member being carried by the electronic wall, the electronic circuit including at least one sensor that co-operates with the controllable member.

2. The flight control handle according to claim 1, wherein the controllable member comprises a knob that is mounted to move relative to the end box and that is arranged at least partially outside of the shell, the at least one sensor co-operating with the knob.

3. The flight control handle according to claim 2, wherein the knob is a rotary knob mounted to move in rotation relative to the end box about an axis of rotation, the rotary knob having a wheel arranged outside of the shell, the at least one sensor co-operating with the rotary knob.

4. The flight control handle according to claim 3, wherein the rotary knob has a shaft constrained to rotate with the wheel about the axis of rotation, the shaft being carried by the electronic wall of the shell, the shaft being mounted to move in rotation relative to the electronic wall.

5. The flight control handle according to claim 1, wherein the controllable member has a touch-sensitive face.

6. The flight control handle according to claim 1, wherein the electronic wall is adjoining to the top face.

7. The flight control handle according to claim 1, wherein the electronic circuit is connected to at least one electrical connection running through the stick-forming grip.

8. The flight control handle according to claim 1, wherein the at least one sensor has at least one pair of dissimilar sensors, the two sensors in the pair being configured to communicate with a same computer.

9. The flight control handle according to claim 8, wherein the two sensors in the pair comprise a Hall effect sensor and a potentiometer.

10. The flight control handle according to claim 8, wherein the at least one sensor has at least two pairs that are configured to communicate with respective ones of two computers.

11. The flight control handle according to claim 3, wherein the wheel has a diameter greater than a length of the shell, the wheel projecting from the shell along at least one direction as seen looking from the wheel towards the shell.

12. A hybrid rotorcraft, the hybrid rotorcraft having a propulsive system comprising at least one propulsive rotor provided with a plurality of first blades having a first variable pitch at least for participating in providing forward propulsion for the hybrid rotorcraft, the hybrid rotorcraft further including a lift rotor provided with a plurality of second blades having a second variable pitch at least for participating in providing lift for the hybrid rotorcraft, the hybrid rotorcraft having a power plant provided with at least one engine operating for the purposes of driving the lift rotor in rotation and of driving the at least one propulsive rotor of the propulsive system in rotation;
   wherein the hybrid rotorcraft has the flight control handle according to claim 1, the electronic circuit being configured to control the first pitch collectively.

13. A hybrid rotorcraft according to claim 12, wherein the flight control handle is mounted to move about a flight control axis for controlling the second pitch collectively.

14. The hybrid rotorcraft according to claim 13, wherein the controllable member comprises a rotary knob mounted to move in rotation relative to the end box about an axis of rotation, wherein the flight control axis is parallel to the axis of rotation.

15. The flight control handle according to claim 1, wherein the at least one electronic wall is a wall of the hollow shell of the end box, the wall of the shell having a thickness, and the electronic circuit is incorporated into the thickness of the wall of the shell.

16. The flight control handle according to claim 1, wherein the at least one electronic wall is integral with the hollow shell.

17. The flight control handle according to claim 1, wherein the at least one electric wall comprises a substrate comprising an integral part of the hollow shell, the substrate having an electrically conductive tract on the substrate.

18. The flight control handle according to claim 17, wherein the substrate has grooves and the electrically conductive tract on the substrate comprises copper disposed within the grooves.

19. A flight control handle suitable to be operatable by a pilot, the flight control handle including an elongated grip member carrying an end box, the end box having a hollow shell having a top face, the end box having a control projecting towards an external environment of the top face, the control movable relative to the shell;

the flight control handle having a controllable member actuatable to generate a control order upon actuation by a pilot, the shell of the end box including an electronic wall incorporating an electronic circuit and carrying the controllable member, the electronic circuit including a sensor that co-operates with the controllable member.

20. A pilot flight control handle, the flight control handle including an elongated member having an end module, the end module having a shell having a top face, the module having a control projecting from the top face, the control mounted to move relative to the shell;

wherein the flight control handle has a controllable member actuatable by a person to be able to generate a control order, the shell of the module including an electronic wall integral with the shell, the electronic wall incorporating an electronic circuit, the controllable member carried by the electronic wall, the electronic circuit including at least one sensor that co-operates with the controllable member.

* * * * *